Patented Aug. 27, 1946

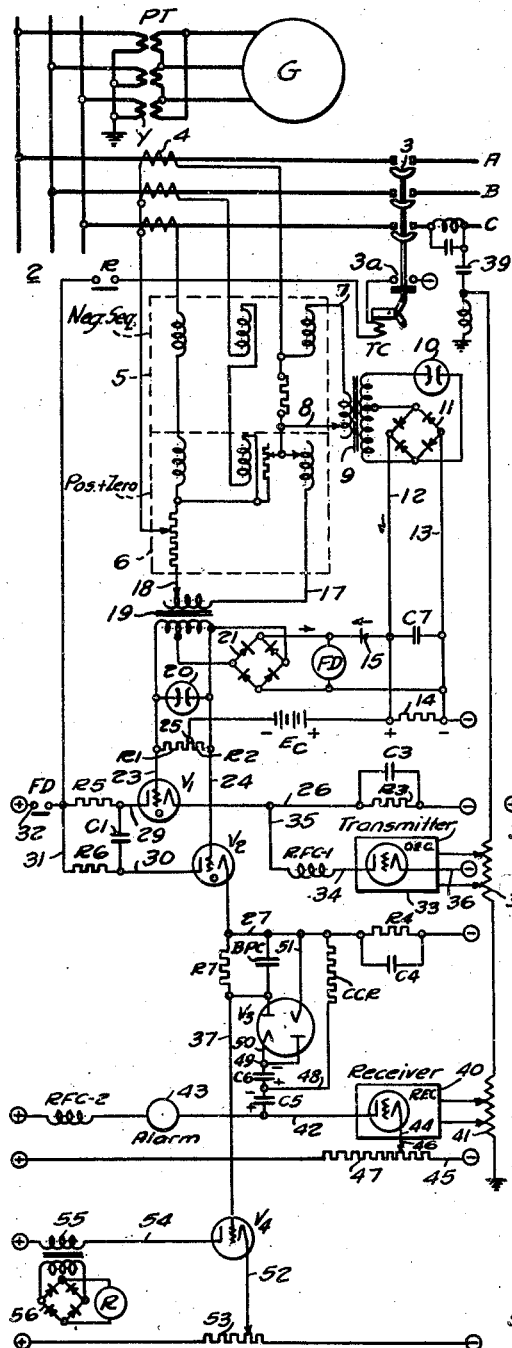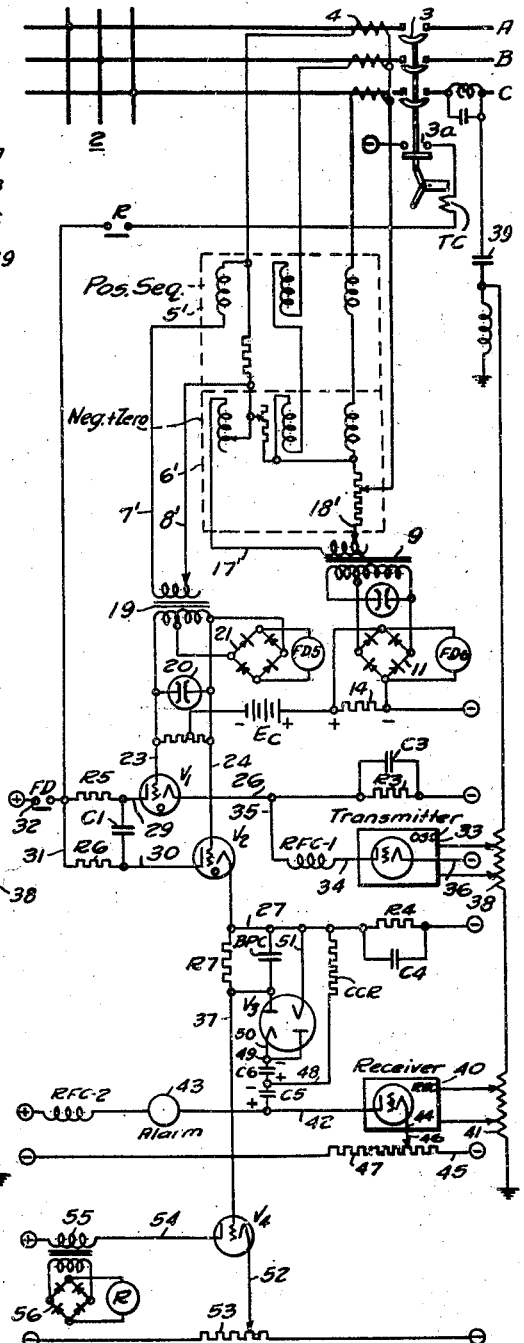

2,406,584

UNITED STATES PATENT OFFICE 2,406,584

RELAY

Myron A. Bostwick, Budd Lake, and Herbert W. Lensner, East Orange, N. J., assignors to Westinghouse Electric Corporation, East Pittsburgh, Pa., a corporation of Pennsylvania Application March 29, 1945, Serial No. 585,524

20 Claims. (Cl. 175—294)

Our present invention relates to a carrier-current or other pilot-channel phase-angle-detecting relaying system, adapted to protect a section of a three-phase transmission-line against faults. Our present invention is an improvement over the system shown in an application of Mehring, Goldsborough and Lensner, Serial No. 534,846, filed May 10, 1944.

One of the problems in connection with a carrier-current relaying system of the type just mentioned has been the problem of providing adequate protection on transmission systems in which the phase-faults may draw current not much more than the maximum load-current, or even less than the maximum load-current. The Mehring et al. protective system utilizes a fault-detector and two trigger-valves, which must be properly coordinated, resulting in settings which have commonly been adjusted as follows:

1. Fault-detector pickup at 150% of maximum load.
2. First trigger-tube to fire at 100% of maximum load.
3. Second trigger-tube to fire at 225% of maximum load.

The fault-detector of the Mehring et al. protective system is an overvoltage relay which responds to a predetermined output-voltage of a positive-plus-zero phase-sequence filter or network. The second trigger-tube provides tripping-impulses on alternate half-cycles of the filter-voltage, for producing a tripping operation in the absence of restraining impulses which are produced in response to the first trigger-tube. In the case of a three-phase fault, the filter-energized fault-detector requires that the fault-current shall be 225% of the maximum load-current, in order to trip. In the case of a phase-to-phase fault, the fault-current must be 1.73 times as much as the three-phase fault-current, or 389% of the maximum load-current, in order to trip. Such a high setting limits the field of application of the Mehring et al. relay-system.

An object of our invention is to provide a fault-detector-means for selectively responding to a locally detectable fault-condition, as distinguished from a balanced three-phase full-load condition, or as distinguished from a balanced three-phase fault-condition, and to utilize such a selectively responsive fault-detector to reduce the settings, or increase the sensitivity of response, of the two trigger-tubes, so that the sensitivity to phase-to-phase faults can be very materially reduced, even to values which are well below the maximum load-current. This is possible, because the load-currents are substantially balanced three-phase currents, which do not affect our selectively responsive fault-detector means.

A further object of our invention is to provide phase-sequence means for developing two different single-phase control-voltages, in response to two different phase-sequence functions of the line-current, utilizing only one of these control-voltages for alternately firing the two trigger-tubes, or for producing the alternate operating and restraining impulses, while utilizing both of the single-phase control-voltages for controlling the fault-detector-means, either in response to the sums of the magnitudes of these two control-voltages, or in response to whichever control-voltage reaches its predetermined magnitude first, the fault-detector means being utilized to control the operation of the trigger-tubes, or to control the production of the alternate operating and restraining impulses.

A further object of our invention is to utilize two phase-sequence functions, one of which is a relatively pure response to one of the rotational phase-sequence functions of the line-current, that is, either the positive or the negative phase-sequence current-component; while the other phase-sequence function is a composite function of the other rotational phase-sequence function and the zero-phase-sequence function of the line-current, to the substantial exclusion of the first-mentioned rotational phase-sequence function.

This is of particular advantage in enabling the relaying system to be utilized in either one of two ways. For normal use, on lines having a source of zero-sequence current at both ends of the protected line-section, a positive-plus-zero phase-sequence filter can be utilized for controlling the timing of the impulses, or the timing of the firings of the first and second trigger-tubes, while a negative-sequence filter can be utilized to increase the sensitivity of the response to the positive-plus-zero filter.

However, there are cases where there is no zero-sequence current at one end of the protected line-section, resulting in a "blind spot," conceivably resulting in an incorrect blocking-operation on an internal two-phase-to-ground fault, as set forth in a Lensner application Serial No. 554,037, filed September 14, 1944. In applying our present invention to such transmission-lines, it is desirable to utilize the negative-sequence filter, with reversed phase-connections, so that it becomes a positive-sequence filter which is utilized to control the timing, in which case the phase-connections of the positive-plus-zero filter will be reversed, to produce a negative-plus-zero filter which is utilized to increase the sensitivity of the timing-response to the positive-sequence filter.

With the foregoing and other objects in view, our invention consists in the circuits, systems, combinations, parts and methods hereinafter described and claimed, and illustrated in the accompanying drawing, wherein:

Figure 1 is a diagrammatic view of circuits and apparatus illustrating the application of our invention to the protection of a system having a source of zero-sequence current at each end of the protected line-section, and Fig. 2 is a similar view showing the application to a transmission system having no sufficient zero-sequence current-source at one end, and also showing a different kind of fault-detector element, which could be interchanged with the single-coil detector shown in Fig. 1.

In Fig. 1, we show the terminal equipment for only one terminal of a three-phase transmission line A, B, C, which is connected to a bus 2 through a three-phase circuit-breaker 3. Only one terminal equipment is illustrated, because the equipment at the other line-terminal or terminals are, or may be, identical with the illustrated equipment. The bus 2, at each of the terminals of the protected line-section which is illustrated in Fig. 1, is connected to the grounded star-winding Y of a power-transformer PT, which is illustrated as being connected to a generator G or other synchronous dynamo-electric machine or machines. The circuit-breaker 3 is illustrated as having a trip-coil TC, and an auxiliary make-contact breaker-switch 3a.

The three-phase line-current is derived by means of a bank of line-current transformers 4, which respond to current-flow in the protected line-section, at the terminal in question. This three-phase line-current is fed into two different kinds of phase-sequence networks or filters 5 and 6.

The network 5 in Fig. 1 is specifically illustrated, in perhaps its preferred form, as a negative-sequence network, which produces a single-phase control-voltage, responsive to the negative-sequence component of the line-current, in the network-terminals 7 and 8. This network, in the broader aspects of our invention, is intended to be representative, however, of any network or filter which selectively responds to a locally detectable fault-condition other than a balanced three-phase fault on the transmission-line, thus including any response which excludes the positive-sequence component.

The network or filter 6 in Fig. 1 may be any network or filter which produces a single-phase control-voltage, in its output-terminals, in response to a composite function of more than one phase-sequence component of the line-current at the relaying terminal, so that it will respond to a plurality of different kinds of faults on the transmission line. Several such single-phase voltage-producing polyphase-current-responsive networks or devices are known. We prefer, for various reasons, to utilize a network 6 which responds to the positive-sequence plus zero-sequence line-current component, as shown in the Harder Patent 2,183,646, granted December 19, 1939, and assigned to the Westinghouse Electric & Manufacturing Company.

The first-mentioned filter 5, which is the negative-sequence filter, has its output-terminals 7 and 8 connected to a saturating transformer 9, the secondary output of which is supervised by a voltage-limiting neon lamp 10, or the equivalent, for producing a roughly approximately sinusoidal, constant-magnitude voltage-wave, as set forth in the Bostwick Patent 2,183,537, granted December 19, 1939, and assigned to the Westinghouse Electric & Manufacturing Company.

A portion of the secondary output-voltage of the negative-sequence transformer 9 is tapped and applied to a rectifier-bridge 11, having direct-current output-terminals 12 and 13. These direct-current terminals 12 and 13 energize two instrumentalities, one being a resistance 14, for producing therein a voltage-drop which is responsive to the negative-sequence component of the line-current.

The other instrumentality energized from the direct-current output-conductors 12 and 13 of the negative-sequence network 5 is the operating winding FD of a fault-detector which may also be designated by the same designation, FD. A rectifier 15 is included in the branch-connections leading from the conductor 12 to the fault-detector FD, so as to permit a fault-detector-energizing current to flow from the rectifier 11 to the fault-detector coil FD, without permitting reverse energy-flow to flow from the fault-detector to the rectifier-terminals 12 and 13, thus insuring that the rectifier-terminals 12 and 13 will reflect the voltage-response to the negative-sequence line-current, without being substantially affected by the voltage which may appear across the fault-detector coil FD. This is necessary, with the kind of fault-detector shown in Fig. 1, because we utilize another source of unidirectional or rectified currents for energizing the fault-detector coil FD, in addition to the negative-sequence-energized rectifier 11, as will be subsequently described. In a more general sense, however, we are not limited to any particular kind of fault-detector, which might be any means for selectively detecting a fault-condition without responding to full-load power-currents on the line.

The second-mentioned phase-sequence filter or network 6, which is the positive-plus-zero filter, has its output-terminals 17 and 18 connected to a saturating transformer 19, the secondary output of which is limited by a neon lamp 20 or the equivalent. A portion of the secondary output-voltage is tapped off and applied to a rectifier-bridge 21, the D. C. terminals of which are connected to energize the fault-detector coil FD. This is the second source of energization for the fault-detector coil FD, which we mentioned above in connection with the rectifier 15.

The rectifier-bridge 21 is thus responsive to the positive-plus-zero phase-sequence components of the line-current. The two rectifier-bridges 11 and 21 feed current, in the same direction, into the fault-detector coil FD, so that the fault-detector coil is impressed with a direct-current voltage from either one of the two rectifier-bridges 11 and 21, whichever bridge has the higher voltage. In case the negative-sequence bridge 11 has a higher voltage, it cannot feed any substantial amount of its energy back, in the reverse-current direction, through the rectifier-bridge 21 into the secondary member of the positive-plus-zero transformer 19, because the rectifier-bridge 21 will not permit any material current-flow in said reverse direction. In case the positive-plus-zero phase-sequence rectifier-bridge 21 has the higher voltage, it cannot feed any substantial proportion of its energy into the loading resistor 14 of the negative-sequence bridge 11, because of the presence of the rectifier 15. Hence, the fault-detector coil FD has a voltage corresponding to the higher one of the two output-voltages of the two rectifier-bridges 11 and 21, while the loading-resistor 14 has a voltage-response only to the negative-sequence rectifier-bridge 11.

The fault-detector FD is thus selectively responsive, through its negative-sequence energization, to locally detectable fault-conditions other than a balanced three-phase fault on the transmission-line. Since the negative-sequence network 5 does not respond to balanced three-phase currents, it can be set to make the fault-detector FD respond more sensitively to fault-conditions, than the equipment (subsequently described) which is responsive solely to the positive-plus-zero filter 6, because the latter must be set high enough to exclude a response to the maximum positive-sequence load-current.

A different form of fault-detector FD is shown in Fig. 2, having two coils, FD5 and FD6, on the same electro-magnet, the coil FD5 being energized solely from the filter-network 5 (or 5'), while the coil FD6 is energized solely from the filter-network 6 (or 6'), so that the fault-detector operates in response to the sum of the two filter-outputs. Either form of fault-detector may be substituted in place of the other, in either Fig. 1 or Fig. 2.

The fault-detector FD in Fig. 1, or FD5 and FD6 in Fig. 2, is also preferably intended to be representative of any multi-responsive fault-detector means, or any equivalent combination of fault-detector means, adapted to be responsive to a plurality of different kinds and phases of ground- and phase-faults on the three-phase transmission-system. This fault-detector FD is utilized to detect the presence of any one of a plurality of different kinds of faults, preferably all different kinds and phases of faults, whether such faults occur within the confines of the protected-line-section, or outside of said protected line-section.

The positive-plus-zero sequence-network 6—19 is also utilized to produce a succession of substantially flat-topped "restraining" voltage-impulses of substantially constant magnitude during the positive half-cycles of the single-phase control-voltage which is produced in the net-work-terminals 23 and 24, and also to produce a succession of substantially flat-topped "operating" voltage-impulses of substantially constant magnitude in response to the negative half-cycles of the control-voltage. To this end, we preferably utilize the same means which is shown in the aforesaid Mehring et al. application.

Thus, as shown in the drawing, we provide two gas triodes or other grid-controlled gas tubes $V_1$ and $V_2$ of a sustained-discharge type; that is, of a type in which the grid fires the tube, or starts the discharge, but is unable to extinguish the tube or interrupt the discharge. The grids of these tubes $V_1$ and $V_2$ are connected to the respective output-terminals 23 and 24 of the network. An intermediate voltage of the output-terminals of the network is derived from two serially connected resistors R1 and R2, which are connected across the network-terminals 23 and 24. The connecting point 25 between these resistors is connected to a negative battery-terminal or bus (—), through a C-battery Ec. The C-battery Ec is so connected as to make the point 25 more negative than the negative battery-terminal (—), or, in general, so as to make the point 25 have a potential too negative, by a predetermined amount, to cause the tubes $V_1$ and $V_2$ to fire, under the impressed anode-cathode voltage-conditions.

The cathode-circuits 26 and 27 of the two gas tubes or trigger-valves $V_1$ and $V_2$ are connected to the negative battery-terminal (—) through cathode-resistors R3 and R4, respectively. The anode-circuits 29 and 30 of these two trigger-tubes are connected to the positive battery-terminal (+) through plate-resistors R5 and R6, respectively, which are connected to a common conductor 31, and thence through a make-contact 32 of the fault-detector FD, (or the fault-detectors FD5 and FD6), to the positive battery-terminal (+). The two anode-circuits 29 and 30 of the gas tubes $V_1$ and $V_2$ are joined by an interconnecting circuit containing a capacitor C1.

The two gas tubes $V_1$ and $V_2$ are thus connected in a so-called "trigger" circuit which operates as follows. During control-voltage half-cycles of one polarity, which we may call the positive half-cycles, the filter-terminal 23 is positive. This filter-terminal 23 is also the grid-terminal of the first gas tube $V_1$. At an early stage in these positive half-cycles, the positive voltage of the network-terminal 23, with respect to the intermediate point 25, becomes more positive than the blocking bias of the C-battery Ec, or at least sufficiently positive to cause the first gas tube $V_1$ to fire. It will be understood that the gas tubes $V_1$ and $V_2$ have such characteristics that, when they are once fired, or when current is once started in their plate-cathode circuits, such plate-cathode current will continue to flow until the voltage applied across the plate and cathode terminals of the tube is reduced to zero or reversed, even for a moment.

At the beginning at the next half-cycle of the output-voltage of the network 6, which we may call a negative half-cycle, the other network-terminal 24 becomes positive with respect to the intermediate point 25, and fires the second gas tube $V_2$.

Before the firing of the second tube $V_2$, the potential of its plate-circuit 30 was substantially the potential of the positive battery-terminal (+), assuming that the fault-detector contact 32 is closed. On the other hand, the potential of the plate-circuit 29 of the first tube $V_1$ was at a somewhat more negative value, due to the voltage-drop in the plate-resistor R5 of the first tube. When the second tube $V_2$ fires, the potential of its plate-circuit 30 tends to drop to the same potential as the plate-circuit 29 of the first tube, but the voltage-charge on the interconnecting capacitor C1 causes the anode-circuit 29 of the first tube $V_1$ to momentarily drop to a value which is more negative than the potential of the cathode-circuit 26 of said first tube $V_1$, thus extinguishing the first tube $V_1$ in the moment required for the discharge of the interconnecting capacitor C1. In the next half-cycle, the first tube $V_1$ fires again, and in turn extinguishes the second tube $V_2$ by momentarily causing a negative voltage to exist across its plate-cathode terminals.

The function of the interconnecting capacitor C1, which shunts the previously firing gas tube when the second tube begins to fire, is preferably supplemented by two capacitors C3 and C4, which are connected in shunt across the respective cathode-resistors R3 and R4 of the two gas tubes $V_1$ and $V_2$. The effect of these shunting-capacitors C3 and C4 is to short-circuit the associated cathode-resistor, R3 or R4, at the first instant of firing of the associated gas-tube, $V_1$ or $V_2$, as the case may be, thus momentarily bringing the anode-potential of the newly fired tube to a value which is more negative than the steady-state anode-potential of the tube which was previously firing. The interconnecting capacitor C1, previous to the firing of the newly fired tube, was charged in such polarity as to momentarily tend to hold the anode-potential of the previously firing tube more negative than the anode-potential of the newly fired tube.

The combined effects of the three capacitors C1, C3 and C4 is to strongly depress the anode-potential of the tube which was firing, at the first instant of firing of the other tube, making the anode-potential of the first tube momentarily more negative than its cathode-potential, thus extinguishing the tube. At the same time, the shunting-capacitor C3 or C4, as the case may be, of the tube that is being extinguished, momentarily holds up its cathode-potential to a value close to the value which it had when the tube was firing, thus assisting in maintaining the reversed tube-voltage for the instant necessary to extinguish the tube.

As explained in the aforesaid Mehring et al. application, the voltage-drops across the two cathode-resistors R3 and R4 are utilized to produce two different effects. The voltage-drop across the cathode-resistor R3 of the first gas tube $V_1$ is utilized to produce half-cycle impulses of square-topped positive voltages for supplying a plate-voltage which is sufficient for initiating and maintaining the operation of an oscillator-tube OSC of a carrier-current transmitter 33, by connecting the plate-circuit 34 of the oscillator-tube OSC, through a radio-frequency choke RFC—1, to a conductor 35, which is connected to the cathode-circuit 26 of the first gas tube $V_1$. The cathode of the oscillator-tube OSC is connected, at 36, to the negative battery-terminal (—).

The voltage-drop across the cathode-resistor R4 of the second gas tube $V_2$ is utilized to apply an operating voltage-component from the cathode-circuit 27 of the second tube $V_2$ to the grid-circuit 37 of a relay-tube $V_4$, which is shown near the bottom of the drawing and which will be subsequently described. A voltage-drop resistor R7 is included in the connection between the cathode-circuit 27 of the second trigger-tube $V_2$ and the grid-circuit 37 of the relay-tube $V_4$.

The carrier-current transmitter 33 is connected to one of the phase-conductors C of the protected line-section through a coupling-transformer 38 and a coupling-capacitor 39.

The carrier-current equipment also includes a receiver 40 which is coupled to the coupling capacitor 39 through a coupling transformer 41. The receiver 40 includes a detector-tube or receiver-tube REC, having a plate or anode-circuit 42 which is connected to the positive battery-terminal (+) through a radio-frequency choke RFC—2, and an alarm-device 43. The receiver-tube REC also has a cathode-circuit 44 which is connected at 45 to the negative battery-terminal (—), through a tap 46 on a potentiometer 47.

The plate or anode-circuit 42 of the receiver-tube REC is coupled, by means of a capacitor C5, to a point 48 which is connected to the cathode-circuit 27 of the second tube $V_2$ through a large, capacitor-charging resistor CCR. The point 48 is also connected, through a capacitor C6, to a conductor 49 which is connected to the cathode-terminal 50 of the left-hand diode of a double-wave rectifier-valve $V_3$. The plate-circuit of this left-hand diode is connected to the grid-terminal 37 of the relay-tube $V_4$, and to the voltage-drop or load-resistor R7. The other terminal of the load-resistor R7 is connected to the cathode-circuit conductor 27 of the second gas triode $V_2$, as previously described. The right-hand diode-circuit 51 of the double-wave rectifier-valve $V_3$ is connected, in the reverse polarity, between the circuits 27 and 49.

The load-resistor R7 is shunted by a radio-frequency by-pass capacitor BPC.

The relay-tube $V_4$ is provided with a cathode-circuit 52 which is connected to an intermediate point of a potentiometer 53 which is energized across the battery-terminals (—) and (+). The relay-tube $V_4$ is also provided with a plate-circuit 54, which is connected to the positive battery-terminal (+), through the primary winding of a relay-coupling transformer 55, the secondary of which is connected, through a rectifier-bridge 56, to the operating coil R of a tripping-relay R. The relay R is provided with a make-contact R, which is shown near the top of the drawing, in series with the trip-coil TC of the circuit-breaker 3.

The make-contact 32 of the fault-detector FD, (or FD5 and FD6), is also connected in the tripping circuit of the circuit-breaker 3, said tripping circuit being traceable from the positive battery terminal (+) through the fault-detector make-contact 32, the conductor 31, and the tripping-relay make-contact R, to the trip-coil TC, and thence through the breaker-switch 3a to the negative battery-terminal (—).

In the operation of the protective system shown in Fig. 1, the carrier-current energy, from both the local and distant transmitters, is received by the receiver-tube REC, so as to produce a plate-cathode current through this tube during periods when the carrier-current energy is being received.

When no carrier-current energy is being received, the anode-terminal 42 of the receiver-tube REC is practically at the potential of the positive battery-terminal (+), and hence the capacitor C5 is charged in accordance with the potential-difference between said anode-terminal 42 of the receiver, and the cathode-terminal conductor 27 of the second gas triode $V_2$, as indicated by the signs + and — at the capacitor C5. This last-mentioned conductor 27 has a potential which is utilized as the operating-voltage for the grid-circuit 37 of the relay-tube $V_4$, this operating-voltage being the voltage-drop through the cathode-resistor R4 of the second gas triode $V_2$, whenever the latter is firing.

When the carrier-current energy is received, the receiver-tube REC becomes conducting, pulling down the potential of its anode-terminal 42 to a point which is more or less close to the potential of the negative battery-terminal (—), thus more or less short-circuiting the capacitor C5, and causing it to discharge, drawing current through the load-resistor R7 and the left-hand diode of the rectifier-valve $V_3$, said diode being connected in such polarity as to permit current-flow in the direction from the conductor 27 through the resistor R7 to the conductor 37, and thence through the left-hand diode to the conductor 50 and the capacitors C6 and C5. At the same time, a much smaller current flows through the much larger capacitor-charging resistance CCR, which is utilized to charge the capacitor C5.

During the periods when no carrier-current energy is being received, in the illustrated form of embodiment of our invention, the receiver plate-circuit 42 again becomes quite positive, so that the right-hand diode-circuit 51 of the rectifier-valve $V_3$ becomes conducting and charges the capacitor C6, as indicated by the signs + and − at the capacitor C6, thus causing this capacitor C6 to act as a voltage-doubler for doubling the effective voltage of the capacitor C5.

When, therefore, carrier-current energy is again received, on the next half-cycle of the line-frequency current, the two capacitors C6 and C5 discharge through the load-resistor R7, thus producing a negative or restraining voltage-drop in said load-resistor R7, making the conductor 37, and hence the grid of the relay-tube $V_4$, negative with respect to the potential of the cathode-circuit conductor 27 of the second tube $V_2$. The reception of carrier-current thus causes the capacitors C6 and C5 to discharge, producing a voltage-drop in the load-resistor R7, making the grid of the relay-tube $V_4$ more negative, and thus effectually preventing this tube from operating in response to the operating-voltage which is produced by the current-flow in the cathode-resistor R4 of the second gas tube $V_2$.

The radio-frequency or carrier-frequency component of the plate-voltage of the receiver-tube REC is by-passed from the load-resistor R7 by the by-passing capacitor BPC.

The receiver-tube REC preferably has a constant-current characteristic, so that whenever its grid permits plate-current to flow, its plate current will have an approximately constant value. Thus, the half cycles of receiver plate-current, during which carrier-current energy is being received by the receiver-tube REC from the distant carrier, transmitted from some other line-terminal, are of an approximately fixed magnitude, regardless of carrier-current attenuation. Hence the restraining voltage-impluses in the resistor R7 are of an approximately fixed magnitude. The receiver plate-current impulses which are received from the distant carrier are of approximately the same magnitude as the half-cycle impulses of plate-current which are produced when carrier-current energy is being received from the local transmitter, even though the local signals may be the stronger.

It is preferable, also, that the relay-tube $V_4$ shall have a constant-current characteristic, so that its plate-current will be constant, without sensitive dependence upon the precise magnitude of its grid-voltage. Thus, the exact amount of the restraining voltage, produced in the load-resistor R7 by the receipt of carrier-current energy, is not important, so long as said restraining voltage is greater than the operating voltage, or the voltage-drop in the resistor R4, by a safe margin.

It is further to be noted that the only carrier-current response of any moment is the response to the distant carrier, that is, the carrier-current impulses which are transmitted from some other line-terminal or terminals. The carrier-current energy received from the local carrier-current transmitter is immaterial, because, by the very nature of the control, it is always transmitted during the half-cycles alternating between the half-cycles when the operating impulses of the second gas triode $V_2$ are produced.

The grid-voltage of the relay-tube $V_4$ is thus made up of three components. First, there is a negative grid-bias consisting of the voltage between the potentiometer-tap 52 and the negative battery-terminal, which is sufficient to bias the grid of the relay-tube $V_4$ so that no plate-current flows in said tube when there is no restraining or operating voltage present. A second component of the grid-voltage of the relay-tube $V_4$ is the operating voltage, in the form of positive voltage-impulses produced whenever the cathode-circuit current of the second gas tube $V_2$ flows through the cathode-resistor R4. The third grid-voltage component of the relay-tube $V_4$ is the restraining voltage, produced by the discharge of the capacitors C6 and C5 through the resistor R7 whenever carrier-current energy is being received, although the restraining impulses which are received from a distant line-terminal are the only ones of importance.

Since the relay-tube $V_4$ will be operated, or carry a plate-current, only when its grid is sufficiently positive with respect to its cathode, a plate-current will flow in the relay-tube $V_4$ only during the positive half-cycles of the grid-voltage of said tube, that is, only when the local operating-impulses of the second-valve cathode-circuit conductor 27 and its cathode-resistor R4 are not opposed by the restraining impulses received from a distant line-terminal.

When there is an internal fault, accompanied by fault-currents which are in phase with each other at the several line-terminals, the plate-current of the relay-tube $V_4$ takes the form of a succession of square-topped half-cycles corresponding in timing to the line-frequency half-cycles when the second gas tube $V_2$ is firing, thus energizing the local tripping-relay R and causing a local tripping-operation.

In the case of an external fault, with line-currents exactly 180° out of phase with each other, the grid-biasing voltage of the relay-tube $V_4$ is entirely negative, and the plate-current of the relay-tube $V_4$ is zero, meaning no response of the relay R, and hence no tripping-operating.

The coordinated responses of the impulse-timing devices, or trigger-valve action, have already been mentioned. While the first trigger-valve $V_1$ can be, and usually is, set to respond sensitively, to rather low line-currents, usually the maximum load-current of the line, because the only effect this valve has is to transmit carrier which is utilized for restraining purposes, the second trigger-valve $V_2$ has to be set at a considerably higher current-value, this valve heretofore responding to a positive-plus-zero network-voltage which is obtained at approximately 225% of the maximum load-current.

This setting has to be somewhat high, because of the nearly constant-voltage characteristic of the output-terminals 23 and 24 of the positive-plus-zero sequence-network 6—19, because the saturating effect of the transformer 19, coupled with the peak-voltage limiting-effect of the neon tube 20, serve to make the single-phase or pulsating voltage which appears across the network-terminals 23 and 24 increase only relatively slightly, even though the line-current increases rather considerably.

The second trigger-valve $V_2$ controls the production of operating or tripping impulses, which are obtained by reason of the voltage-drop through the cathode-resistor R4, and these operating impulses will cause tripping, if not blocked by restraining impulses which are produced by the receipt of carrier-current energy from the other line-terminal or terminals of the protected line-section. It is necessary, therefore, for the current-responsive setting of the second trigger-valve $V_2$ to be considerably higher than that of the first trigger-valve $V_1$, so as to make sure that the first valve, at the remote terminal, will be firing before the second valve, at the relaying terminal, commences to fire.

As previously mentioned, this problem in coordination has made the previously known relaying-system of the Mehring et al. application incapable of fully protecting a transmission-system in which the minimum possible fault-current, under certain system operating-conditions, might approach the value of the maximum load-current, or might even be smaller than the load-currents which are permissible or obtainable under certain other operating-conditions of the transmission-system.

In accordance with our present invention, we have added the negative-sequence filter 5, or means which is capable of being set to respond more sensitively to the fault-currents than the positive-plus-zero sequence-response, which must be set to exclude the 100% maximum positive-sequence load-current; and we have applied this more sensitive fault-response to do two things, both to increase the sensitivity of the fault-detector FD, and to increase the sensitivity of the timing-tubes $V_1$ and $V_2$ to the alternations or pulsations of the positive-plus-zero output-voltage of the network-terminals 23 and 24. In this way, we make it possible to apply the positive-plus-zero timing to transmission systems which may have phase-fault current-magnitudes actually below the full load-current.

It is to be noted that our change in the sensitivity of response does not change the essential characteristic of the pilot-channel phase-angle-detecting relaying system, which compares the relative phases of the two positive-plus-zero sequence-quantities at the two ends of the protected line-section, in order to determine whether a fault-condition is the result of an internal or external fault. All we do to the operation of the phase-angle-detecting relaying-system is to increase its sensitivity, which we preferably accomplish by changing the bias on the trigger-tubes, when any faults are encountered other than balanced three-phase faults, while at the same time providing sufficiently sensitive fault-detecting means, which we preferably accomplish by increasing the energy or voltage which is applied to the fault-detector coil FD when other than balanced three-phase faults are encountered.

Thus, the voltage-drop resistor 14 is traversed by a unidirectional current which is responsive to the negative-sequence component of the three-phase line-current, and this voltage-drop is utilized to supply the two trigger-tubes $V_1$ and $V_2$ with a grid-voltage component in a polarity facilitating the operative conductivity of the tubes, or tending to make each tube become effectively conducting. In other words, the voltage-drop in the negative-sequence-excited resistor 14 considerably decreases the margin between the potential of the intermediate point 25 in the grid-control circuit, and the positive grid-potential which is necessary to initiate the firing of the respective tubes $V_1$ and $V_2$.

If desired, the ripples in the unidirectional negative-sequence-responsive voltage, which appears across rectifier-terminals 12 and 13, may be smoothed out, as by means of a capacitor C7, so as to make the biasing voltage-drop in the rectifier 14 substantially non-pulsatory.

In the operation of the system which is shown in Fig. 1, the phase-angles of the fault-currents at opposite ends of the protected line-section are still compared by utilizing a single-phase voltage having a phase which is responsive to some phase-sequence function of the three-phase line-current, especially a single-phase voltage having a phase which is responsive to the positive-plus-zero sequence-components of the line-current, as in the Mehring et al. application. What we have accomplished, is to achieve a sensitive response to this single-phase voltage-component, without interfering with the normal use of the line to transmit its maximum full-load current.

In order to accomplish this purpose of our invention, it is possible to utilize any kind of a sensitive fault-detector, which discriminates between faults and the balanced three-phase load currents of the line.

According to this aspect of our invention, therefore, we may regard the negative-sequence network 5, and all apparatus energized therefrom, as being symbolic or representative of any sensitive fault-detector-means which discriminates between balanced three-phase faults, which involve only positive-sequence currents, and faults having any either sequence-components, that is, faults having either negative-sequence or zero-sequence current-components, or both negative and zero-sequence components. Such fault-detectors, or in general, any means for distinguishing between faults and load-currents, do not necessarily have to be of the overcurrent type. They may be of the voltage-responsive type, responding to line-voltages, or they may be of the impedance or reactance or mixed impedance and reactance types. All of these forms of fault-detectors are well known in the art, and it is desired, in accordance with one of the broader aspects of our invention, for the negative-sequence network 5, and its associated apparatus, to be regarded as the equivalent of any fault-detector-means which is equivalent to it in the sense of being able to discriminate between balanced three-phase faults (or loads) and any other kind of faults, (or all kinds of faults), so that the fault-detector can be set to respond sensitively to the fault-condition, without running the risk of responding to the balanced load-currents of the line.

There is a particular advantage in our choice of the negative-sequence network 5, as the preferred specific form of means for effecting a selective response to faults which are not balanced three-phase faults. The reason for this is that, as pointed out in the aforesaid Lensner application, certain transmission systems are either permanently, or at times temporarily, operated under system-conditions in which there is not a sufficient or adequate ground-current connection at one end of a line-section which is to be protected. When this condition occurs, the positive-plus-zero phase-sequence impulse-timing system has one possible theoretical defect, which is apparent in the event of a ground-fault involving two of the phase-conductors of the line, between the ends of the protected line-section. Under such conditions, the positive-plus-zero network produces a single-phase voltage which is responsive to the vectorial sum of the positive-sequence line-current and the zero-sequence line-current, at one end of the protected line-section, while the positive-plus-zero network at the other end responds only to the phase of the positive-sequence current, without having any zero-sequence component to modify the phase or timing of this response. There is at least a theoretical possibility of the transmission of restraining-impulses, under these conditions, thus blocking tripping when a tripping-operation is desired.

As pointed out in the Lensner application, this difficulty can be avoided by utilizing only the positive-sequence component for controlling the timing of the impulses, and energizing the fault-detector to be responsive to some fault-condition other than the positive-sequence line-current components. In some respects, this is not altogether as desirable an arrangement, for all-purpose applications of the phase-comparing relaying system, as the system of the Mehring et al. application, in which the impulse-timing control is responsive to the vectorial sum of the properly weighted components of both the positive and zero phase-sequence components of the line-current.

In our invention, it is possible, with a single apparatus, by a mere change in the phase-sequence of the filter-connections, to utilize the equipment in either one of the two ways. The negative-sequence network 5 of Fig. 1, by a mere reversal of two of its phases, becomes a positive-sequence network, as shown at 5' in Fig. 2. The positive-plus-zero network 6 of Fig. 1 becomes, by a mere interchange of two of its phase-connections, a negative-plus-zero sequence-network, as shown at 6' in Fig. 2. The positive-sequence network-terminals 7' and 8', in Fig. 2, can be utilized to energize the saturating transformer 19, which has the output-terminals 23 and 24, as previously described; while the negative-plus-zero network-terminals 17' and 18' of the negative-plus-zero network 6' may be utilized, in Fig. 2, to energize the saturating transformer 9, which is connected to the rectifier-bridge 11, as previously described.

With these simple changes, the apparatus of Fig. 1 becomes applicable, in Fig. 2, to the protection of a system which may have no adequate source of zero-sequence current at one terminal of the protected line-section. Thus, the equivalent of the grounded star-connected winding Y, in Fig. 1, may be omitted at one or the other of the terminals of the protected line-section A, B, C, in Fig. 2.

The illustration shown in Fig. 2 also shows the two-coil type of fault-detector FD5 and FD6, which has already been described as an alternative form of the single-winding fault-detector FD of Fig. 1. The fault-detector make-contact 32 in Fig. 2 may still be designated by the letters FD.

The operation of the system shown in Fig. 2 is the same as that shown in Fig. 1, except that the positive-sequence component of the line-current is utilized to control the timing of the firings of the trigger-tubes $V_1$ and $V_2$, which respectively control the restraining impulses and the operating impulses which are applied to the relay-tube $V_4$, and thence to the tripping relay R; while the vectorial sum of the properly weighted components of the negative and zero-sequence components of the line-current are utilized to make the fault-detector FD and the voltage-drop biasing-resistor 14 responsive to both the negative-sequence line-current component and the zero-sequence component, to the exclusion of the positive-sequence response. Thus, whenever there is any substantial negative-sequence or zero-sequence component in the three-phase line-current, the phase-responsive or impulse-timing-control trigger-tubes $V_1$ and $V_2$ may be made to respond, very sensitively, to the positive-sequence component of the line-current, which will always be present at both ends of a faulted line-section, and this positive-sequence response, because it is supervised by selective fault-responsive negative-plus-zero phase-sequence means, may be responsive to positive-sequence current magnitudes which are well below the value of the maximum load-current.

While we have illustrated our invention in only two forms of embodiment which are at present preferred by us, we desire it to be understood that these illustrations are only by way of illustration, and are not at all intended as being limitations on the precise form of embodiment of our invention, particularly in its broader aspects. We desire, therefore, that the appended claims shall be accorded the broadest construction consistent with their language.

We claim as our invention:

1. Terminal equipment for a pilot-channel phase-angle-detecting relaying system adapted to protect a section of a three-phase transmission-line against faults, comprising phase-sequence means for developing two different single-phase control-voltages in response to two different phase-sequence functions of the line-current at the relaying terminal, local control-means responsive to a first one of said control-voltages for producing a succession of restraining impulses in response to positive half-cycles of said first control-voltage when said control-voltage exceeds a predetermined magnitude, and for producing a succession of operating impulses in response to negative half-cycles of said first control-voltage when said control-voltage exceeds a predetermined magnitude, means responsive to the second control-voltage for increasing the sensitiveness of the response of said local control-means to said first control-voltage, fault detector means for responding to a predetermined magnitude of said first control-voltage or to a predetermined magnitude of said second control-voltage, whichever control-voltage reaches its predetermined magnitude first, means for utilizing said fault-detector means in controlling said local control-means, pilot-channel means operative to transmit said succession of restraining impulses and to make them effective at another line-terminal or terminals, and phase-angle-detecting relay-means operative to respond to said operating impulses when they are not effectively opposed by restraining-impulses received from a distant line-terminal.

2. Terminal equipment for a pilot-channel phase-angle-detecting relaying system adapted to protect a section of a three-phase transmission-line against faults, comprising phase-sequence means for developing a single-phase control-voltage in response to a composite function of more than one phase-sequence component of the line-current at the relaying terminal, for responding to a plurality of different kinds of faults on the transmission line, local control-means responsive to said control-voltage for producing a succession of restraining impulses in response to positive half-cycles of said control-voltage when said control-voltage exceeds a predetermined magnitude, and for producing a succession of operating impulses in response to negative half-cycles of said control-voltage when said control-voltage exceeds a predetermined magnitude, fault-detector means for selectively responding to a locally detectable fault-condition other than a balanced three-phase fault on the transmission-line, means for utilizing said fault-detector means to increase the sensitivity of response of said local control-means, pilot-channel means operative to transmit said succession of restraining impulses and to make them effective at another line-terminal or terminals, and phase-angle-detecting relay-means operative to respond to said operating impulses when they are not effectively opposed by restraining impulses received from a distant line-terminal.

3. The invention as defined in claim 1, characterized by one of said phase-sequence functions being a relatively pure response to one of the rotational phase-sequence functions of the line-current, and the other of said phase-sequence functions being a composite function of the other rotational phase-sequence function and the zero phase-sequence function of the line-current, to the substantial exclusion of the first-mentioned rotational phase-sequence function.

4. The invention as defined in claim 1, characterized by the phase-sequence function which controls said first one of said control-voltages being a composite function of the positive and zero phase-sequence functions of the line-current, to the substantial exclusion of the negative phase-sequence function, while the phase-sequence function which controls the other control-voltage is a relatively pure response to the negative phase-sequence function of the line-current.

5. The invention as defined in claim 1, characterized by the phase-sequence function which controls said first one of said control-voltages being a relatively pure response to the positive phase-sequence function of the line-current, while the phase-sequence function which controls the other control-voltage is a composite function of the negative and zero phase-sequence functions of the line-current, to the substantial exclusion of the positive phase-sequence function.

6. The invention as defined in claim 1, characterized by the phase-sequence function which controls said first one of said control-voltages being a composite function of the positive and zero phase-sequence functions of the line-current, to the substantial exclusion of the negative phase-sequence function.

7. The invention as defined in claim 1, characterized by the phase-sequence function which controls the second control-voltage being a composite function of the negative and zero phase-sequence functions of the line-current, to the substantial exclusion of the positive phase-sequence function.

8. Terminal equipment for a pilot-channel phase-angle-detecting relaying system adapted to protect a section of a three-phase transmission-line against faults, comprising phase-sequence means for developing two different single-phase control-voltages in response to two different phase-sequence functions of the line-current at the relaying terminal, local control-means responsive to a first one of said control-voltages for producing a succession of restraining impulses in response to positive half-cycles of said first control-voltage when said control-voltage exceeds a predetermined magnitude, and for producing a succession of operating impulses in response to negative half-cycles of said first control voltage when said control-voltage exceeds a predetermined magnitude, means responsive to the second control-voltage for increasing the sensitiveness of the response of said local control-means to said first control-voltage, fault-detector means for responding jointly to said first and second control-voltages, means for utilizing said fault-detector means in controlling said local control-means, pilot-channel means operative to transmit said succession of restrained impulses and to make them effective at another line-terminal or terminals, and phase-angle-detecting relay-means operative to respond to said operating impulses when they are not effectively opposed by restraining impulses received from a distant line-terminal.

9. Terminal equipment for a pilot-channel phase-angle-detecting relaying system adapted to protect a section of a three-phase transmission-line against faults, comprising phase-sequence means for developing a single-phase control-voltage in response to a phase-sequence function of the line-current at the relaying terminal, local control-means responsive to said control-voltage for producing a succession of restraining impulses in response to positive half-cycles of said control-voltage when said control-voltage exceeds a predetermined magnitude, and for producing a succession of operating impulses in response to negative half-cycles of said control-voltage when said control-voltage exceeds a predetermined magnitude, fault-detector means for selectively responding to a locally detectable fault-condition as distinguished from a balanced three-phase full-load condition on the transmission-line, means for utilizing said fault-detector means to increase the sensitivity of response of said local control-means, pilot-channel means operative to transmit said succession of restraining impulses and to make them effective at another line-terminal or terminals, and phase-angle-detecting relay-means operative to respond to said operating impulses when they are not effectively opposed by restraining impulses received from a distant line-terminal.

10. The invention as defined in claim 8, characterized by one of said phase-sequence functions being a relatively pure response to one of the rotational phase-sequence functions of the line-current, and the other of said phase-sequence functions being a composite function of the other rotational phase-sequence function and the zero phase-sequence function of the line-current, to the substantial exclusion of the first-mentioned rotational phase-sequence function.

11. The invention as defined in claim 8, characterized by the phase-sequence function which controls said first one of said control-voltages being a composite function of the positive and zero phase-sequence functions of the line-current, to the substantial exclusion of the negative phase-sequence function, while the phase-sequence function which controls the other control-voltage is a relatively pure response to the negative phase-sequence function of the line-current.

12. The invention as defined in claim 8, characterized by the phase-sequence function which controls said first one of said control-voltages being a relatively pure response to the positive phase-sequence function of the line-current, while the phase-sequence function which controls the other control-voltage is a composite function of the negative and zero phase-sequence functions of the line-current, to the substantial exclusion of the positive phase-sequence function.

13. The invention as defined in claim 8, characterized by the phase-sequence function which controls said first one of said control-voltages being a composite function of the positive and zero phase-sequence functions of the line-current, to the substantial exclusion of the negative phase-sequence function.

14. The invention as defined in claim 8, characterized by the phase-sequence function which controls the second control-voltage being a composite function of the negative and zero phase-sequence functions of the line-current, to the substantial exclusion of the positive phase-sequence function.

15. Terminal equipment for a pilot-channel phase-angle-detecting relaying system adapted to protect a section of a three-phase transmission-line against faults, comprising phase-sequence means for developing two different single-phase control-voltages in response to two different phase-sequence functions of the line-current at the relaying terminal, local control-means responsive to a first one of said control-voltages for producing a succession of restraining impulses in response to positive half-cycles of said first control-voltage when said control-voltage exceeds a predetermined magnitude, and for producing a succession of operating impulses in response to negative half-cycles of said first control-voltage when said control-voltage exceeds a predetermined magnitude, means responsive to the second control-voltage for increasing the sensitiveness of the response of said local control-means to said first control-voltage, fault-detector means for responding to the sum of the magnitudes of said first and second control-voltages, means for utilizing said fault-detector means in controlling said local control-means, pilot-channel means operative to transmit said succession of restraining impulses and to make them effective at another line-terminal or terminals, and phase-angle-detecting relay-means operative to respond to said operating impulses when they are not effectively opposed by restraining impulses received from a distant line-terminal.

16. The invention as defined in claim 15, characterized by one of said phase-sequence functions being a relatively pure response to one of the rotational phase-sequence functions of the line-current, and the other of said phase-sequence functions being a composite function of the other rotational phase-sequence function and the zero phase-sequence function of the line-current, to the substantial exclusion of the first-mentioned rotational phase-sequence function.

17. The invention as defined in claim 15, characterized by the phase-sequence function which controls said first one of said control-voltages being a composite function of the positive and zero phase-sequence functions of the line-current, to the substantial exclusion of the negative phase-sequence function, while the phase-sequence function which controls the other control-voltage is a relatively pure response to the negative phase-sequence function of the line-current.

18. The invention as defined in claim 15, characterized by the phase-sequence function which controls said first one of said control-voltages being a relatively pure response to the positive phase-sequence function of the line-current, while the phase-sequence function which controls the other control-voltage is a composite function of the negative and zero phase-sequence functions of the line-current, to the substantial exclusion of the positive phase-sequence function.

19. The invention as defined in claim 15, characterized by the phase-sequence function which controls said first one of said control-voltages being a composite function of the positive and zero phase-sequence functions of the line-current, to the substantial exclusion of the negative phase-sequence function.

20. The invention as defined in claim 15, characterized by the phase-sequence function which controls the second control-voltage being a composite function of the negative and zero phase-sequence functions of the line-current, to the substantial exclusion of the positive phase-sequence function.

MYRON A. BOSTWICK.
HERBERT W. LENSNER.